Oct. 12, 1926.

A. N. CRAMER 1,603,196

CUTTING APPARATUS FOR GLASS FEEDERS

Original Filed August 6, 1920   2 Sheets-Sheet 1

INVENTOR
A. N. Cramer
BY
J. F. Rule.
HIS ATTORNEY

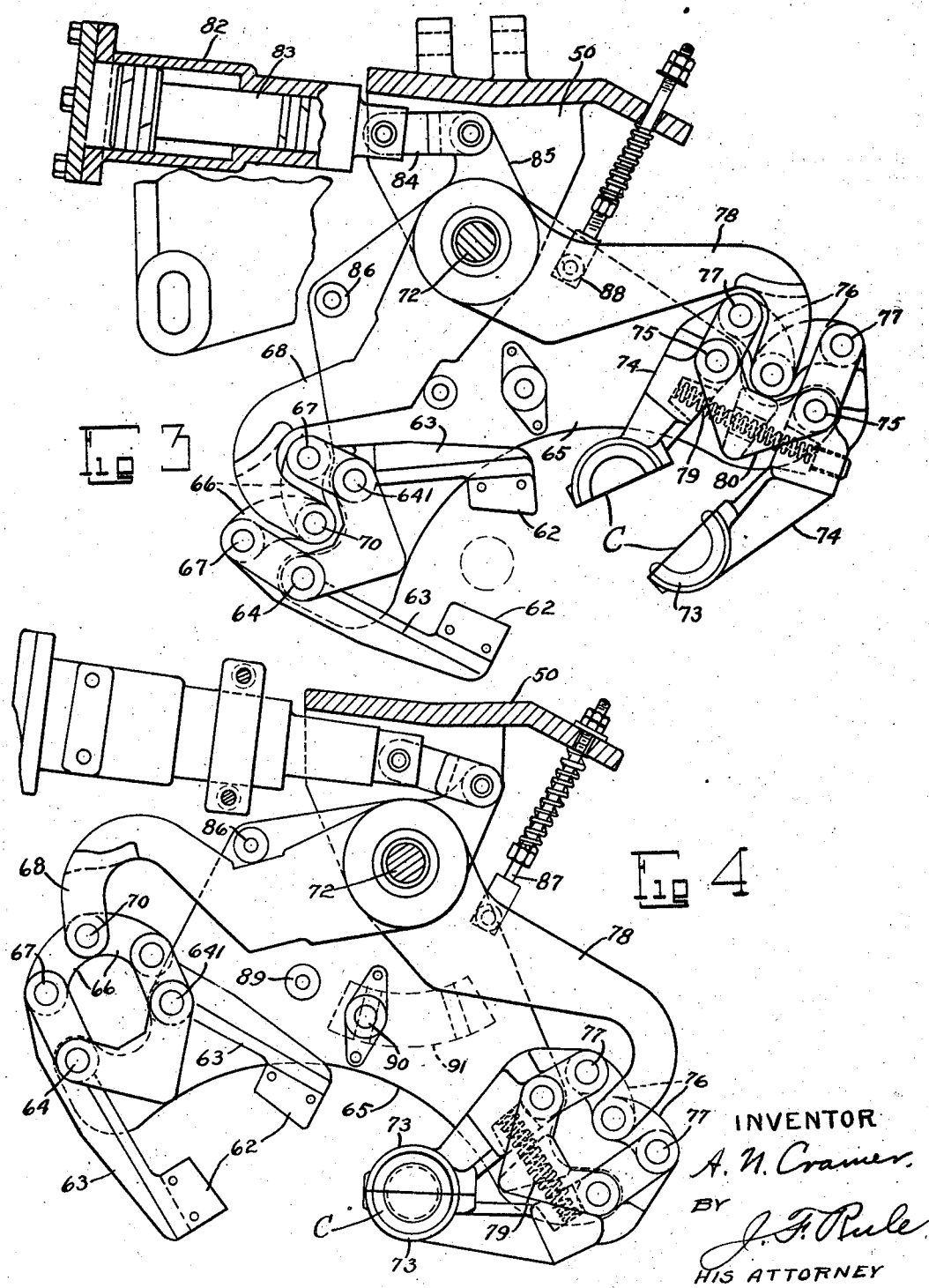

Patented Oct. 4, 1926.

1,603,196

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

CUTTING APPARATUS FOR GLASS FEEDERS.

Original application filed August 6, 1920, Serial No. 401,638. Divided and this application filed September 13, 1924. Serial No. 737,461.

My invention relates to apparatus for delivering mold charges or masses from a supply of molten glass, and more particularly to the cutting apparatus by which the charges are severed from the source of supply.

In the preferred form of construction, the molten glass is caused to flow or issue from an outlet in the bottom of a container. Cutting means comprising a pair of shears, and a retarding cup, are mounted on a reciprocable support, by which the cup and shears are brought alternately into operating position beneath the outlet. A single motive element, as an air cylinder, is used to reciprocate the support and actuate the cup and cutter, thereby providing a simplified mechanical construction. The cutter comprises a pair of blades and a toggle link connection so arranged that an opening and closing movement of the blades is effected by a single direct movement of the actuating device, giving a quick cutting movement. Moreover, the toggle arrangement insures a maximum effective pressure or power applied to the blades at the time of cutting.

A further feature of the invention relates to the mounting of the pivoted knife arms in such manner that a resilient downward tension is applied to the pivot of the upper blade, and a resilient upward tension to its mate. The arrangement is such that the blades are both uniformly tensioned. Furthermore, one of the blades is adjustable into and out of relation to its mate. This construction permits regulation of the overlap of the blades as may be required to insure proper cutting. The adjustment may readily be made after the parts are assembled, and if desired, without interrupting the operation of the cutter. This adjustment avoids the need of the usual shims or other expedients commonly employed to compensate for the reduced thickness of the cutters when ground to maintain their cutting edges.

Other features and advantages will appear hereinafter.

The present application is a division of my co-pending application Serial Number 401,638, filed August 6, 1920, forming hot glass into mold charges.

In the accompanying drawings:

Figure 3 is a plan view of the cutting mechanism, the retarding cup, and the actuating means for said parts.

Figure 4 is a similar view with the parts in a different position.

Figure 1:
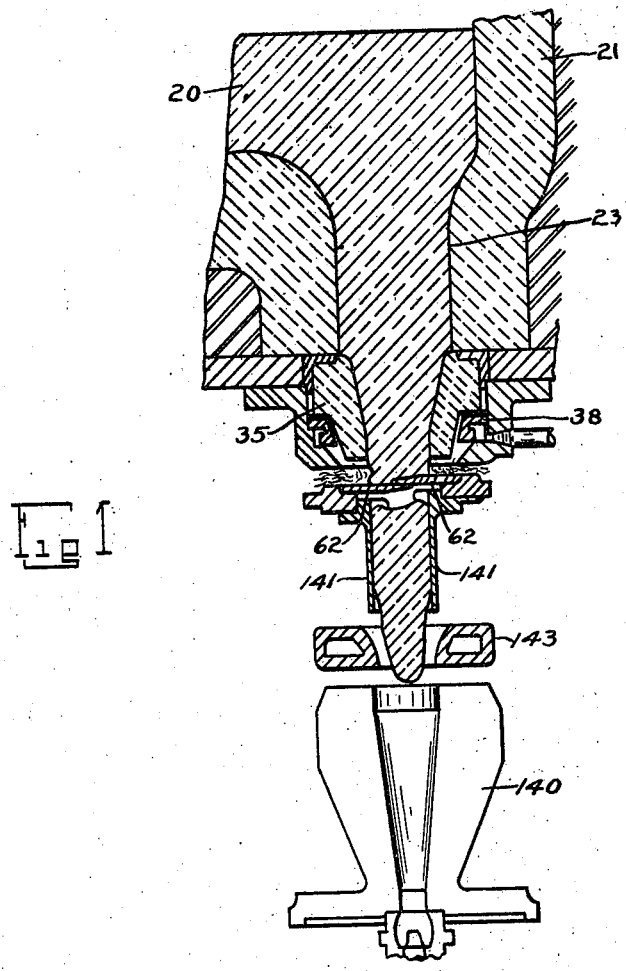
Figure 1 is a sectional elevation through the furnace boot or spout from which the glass issues, and shows a severed charge of glass being dropped into a mold.

The molten glass 20 is supplied from a container 21 which in the present instance is a furnace boot or extension formed with a spout or passageway 23 through which the glass is discharged. The glass issues through an outlet opening formed in a clay bushing 35 beneath and in alignment with the spout 23. A ring burner 38 surrounding the bushing serves to maintain a suitable high temperature of the issuing glass and surrounding parts.

The flowing glass is periodically severed at a point beneath the burner to form individual masses or gobs which are permitted to drop into the molds 140 of a glass forming machine. After each cutting operation, a controlling device in the form of a cup C (Fig. 4) is brought beneath the outlet and cooperates with the burner to control, support, shape and reheat the glass. The apparatus for actuating the cutter and cup is mounted on a supporting frame 50 located beneath the furnace boot 21.

The cutting mechanism comprises a pair of shear blades 62 on arms 63 pivotally supported by pivot pins 64 and 641 on a reciprocating plate 65. Toggle links 66 are connected by pivots 67 to the cutter levers 63. A cutter operating arm 68 is connected by a pivot pin 70 to the toggle links. The arm 68 is fulcrumed to swing about a pivot pin 72 mounted in the frame 50.

Figure 2:
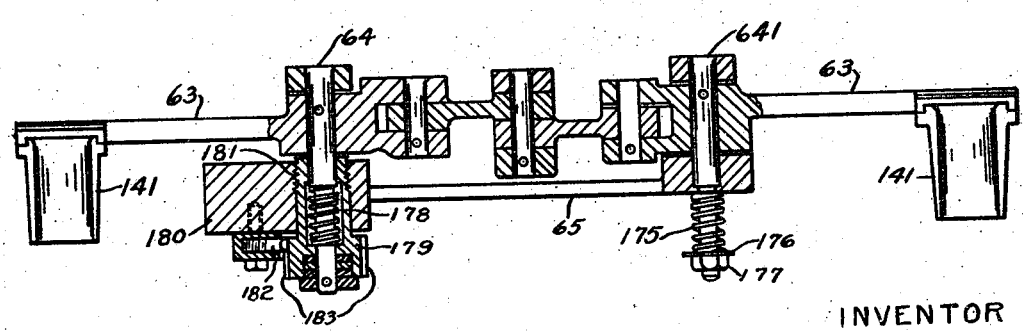
Figure 2 is a part sectional elevation of the cutter mechanism.

Tensioning means (Fig. 2) are provided in connection with the knife arms 63 whereby the upper blade is caused to bear downwardly against the lower blade, and the lower blade upwardly. Such means comprises a spring 175 mounted on the pivot pin 641 of the upper blade, said spring being held under tension between the plate 65 and a washer 176 on the pivot pin, the tension of the spring being adjustable by means of a nut 177. A spring 178 mounted on the pivot pin 64 applies an upward tension to the latter and to the knife arm 63 which is keyed to said pivot pin. The lower end of the spring 178 bears downwardly against a sleeve 179 mounted in a block 180 forming an integral part of the plate 65. The sleeve 179 has a threaded connection 181 with the block, whereby the pivot pin and attached arm 63 are adjustable up and down, so that the knife blades are relatively adjustable vertically. The sleeve 179 is held in its adjusted position by a spring actuated detent 182 which engages notches 183 in the periphery of the sleeve 179. This method of adjustment permits the blades to be accurately adjusted after the parts are assembled, and renders unnecessary the use of the usual shims which are ordinarily employed to adjust the knives closer together after they have been ground thinner to maintain their cutting edges.

The cup C comprises horizontally separable sections 73 carried on levers 74 connected by pivots 75 to the plate 65. Toggle links 76 pivoted to said levers at 77 are actuated by an arm 78 fulcrumed to swing about the pivot pin 72. A coil spring 79 supported in a yoke 80, bears at its ends against the levers 74.

The cup and cutting mechanism are operated by an air motor 82 mounted on the under side of the frame 50, said motor comprising a piston rod 83 connected through a link 84 to a lug or extension 85 of the knife operating arm 68.

The operation of the cutter and cup is as follows: Figure 3 shows the position of parts just before the cutting operation. The motor 82 now operates, the piston rod 83 being moved to the right. This swings the cutter arm 68 about its fulcrum 72. The toggle links 66 are thereby actuated, first moving the blades 62 together to shear the glass, and as the pivot pin 70 moves beyond the pivots 67, the cutter blades are separated. By this time the arm 68 has been brought up against a stop 86 on the plate 65 so that the continued movement of the arm 68 causes said plate to swing with it about the pivot 72. The cutter mechanism is thus moved bodily to the left beyond the flow opening and the cup sections carried inward to positions on opposite sides of and in line with the flow opening. Before the plate 65 completes its movement, the cup actuating arm 78 is arrested by a rod 87 connected at 88 to the arm 78 and having a sliding connection at its opposite end with the frame 50. The arm 78 being thus arrested, the final movement of the plate 65 causes the toggle links 76 to be straightened and close the cup sections, as shown in Figure 4. The cup C is now in position directly beneath the flow. The parts retain this position until the motor 82 is reversed and returns the parts to the Figure 3 position. During this return movement, the arm 68 swings from the stop 86 to the stop 89, thereby moving the toggle links 66 inward. This gives an idle shearing movement to the cutters, which is merely incidental to positioning the toggle links for the next cut. Movement of the plate 65 at this time is prevented by a friction brake consisting of a spring pressed lug 90 bearing against a block 91 and which may seat in recesses in said block. After the arm 68 strikes the stop 89 the plate 65 is swung to the right. As it commences such movement, the pivots 77 are moved therewith relatively to the arm 78 and cause the cup sections to be separated. The spring 79 assists in opening the cup with a snap action. The parts are thus brought to the Figure 3 position in which they remain until the motor 82 again operates to repeat the cycle of movements above described.

The gobs of glass when severed from the oncoming stream, as shown in Figure 1, drop directly into the blank molds 140 of the glass forming machine. Forming elements or shields 141 are mounted on the cutter arms 63 in position to surround the gob of glass as the latter is severed and serve to guide the glass in its downward movement, and may have more or less of a compressing and shaping action on the glass. The gobs drop through stationary guiding rings or funnels 143 directly beneath the flow opening.

Modifications may be resorted to within the spirit and scope of my invention.

What I claim is:

1. The combination with means for flowing glass, of cutting mechanism for periodically severing the glass comprising shear blades, levers carrying said blades, a toggle connecting said levers, a pivoted support on which said levers are mounted, means to oscillate said support about its pivot and thereby swing said levers and toggle bodily into and out of a position in operative relation to the flowing glass, a lever arm fulcrumed on said pivot and connected to said toggle, and means to swing said arm and thereby actuate the toggle when in said position and thereby actuate the shear blades.

2. The combination with a container for molten glass, provided with an outlet orifice in the bottom thereof, of cutting mechanism beneath the container comprising a pair of levers, cutter blades thereon, a carrier on which said levers are mounted, means to oscillate said carrier about a stationary fulcrum and thereby swing the blades toward and from said outlet, toggle links connecting said levers, and an actuating arm mounted to swing about said fulcrum and connected to said links and operable by a single movement to reciprocate said levers and thereby shear the glass.

3. Mechanism for periodically severing molten glass, comprising cutter blades, levers on which the blades are mounted, a pair of toggle links connecting said levers and holding the cutter blades closed when the links are in such position that the pivot connecting the links is in line with the pivots which connect the links to the levers, and an arm operable by a single movement to move the toggle links to and beyond said position and thereby reciprocate said levers and cause them to close and open the cutter blades.

4. Mechanism for periodically severing molten glass, comprising cutter blades, levers on which the blades are mounted, a pair of toggle links connecting said levers, and an actuating arm connected to the toggle links operable by a single movement to actuate the toggle links and cause the cutter blades to sever the glass and by a continuation of said movement to move said levers bodily away from the cutting position.

5. The combination with means for flowing molten glass, of mechanism for periodically severing the glass, comprising shear blades, levers on which said blades are mounted, toggle links connecting said levers, a piston motor, and mechanism between the motor and said levers whereby the latter are operated to shear the glass and then withdrawn bodily by a single movement of the motor piston.

6. The combination with means for flowing molten glass, of shearing mechanism to sever the glass, comprising a pair of levers, shear blades carried by said levers, a movable carrier on which said levers are mounted, toggle links connecting said levers, a swinging arm operable to move said carrier and having a lost motion connection therewith, and a piston motor connected to said arm for actuating it, said arm operable by a single movement to actuate said toggle links and thereby close and open the shear blades for severing the glass and then to move said carrier and withdraw said levers bodily away from the cutting position.

7. Means for severing charges from downwardly discharging molten glass, comprising, in combination, cutter arms, blades carried thereby, means to actuate said arms and cause the blades to move transversely and shear the glass, means to cause the upper blade to bear downward with a spring pressure against the lower blade, and separate means for causing an upward spring pressure of the lower blade against the upper blade.

8. Means for severing charges from downwardly discharging molten glass, comprising, in combination, cutter arms, blades carried thereby, means to actuate said arms and cause the blades to move transversely and shear the glass, means to cause the upper blade to bear downward with a spring pressure against the lower blade, separate means for causing an upward spring pressure of the lower blade against the upper blade, and means operable while the parts are assembled for adjusting one blade up and down relative to the other.

9. Mechanism for shearing molten glass, comprising, in combination, a support, levers, cutter blades carried thereby, pivot pins mounted in said levers and journalled in said support, a spring by which a downward tension is applied to one of said pivot pins, and a spring by which an upward tension is applied to the other pivot pin.

10. Mechanism for shearing molten glass, comprising, in combination, a support, levers, cutter blades carried thereby, pivot pins mounted in said levers and journalled in said support, a spring by which a downward tension is applied to one of said pivot pins, a spring by which an upward tension is applied to the other pivot pin, and means for adjusting one of said pins with its connected lever up and down in said support.

11. Cutting mechanism comprising, in combination, shear blades, levers on which said blades are mounted, toggle links connecting said levers, a piston motor, and mechanism between the motor and said levers whereby the latter are operated about their pivots to effect a shear cut and then withdrawn bodily from the cutting position by a single movement of the motor piston.

12. Cutting mechanism comprising, in combination shear blades, levers on which said blades are mounted, toggle links connecting said levers, a piston motor, and mechanism between the motor and said levers whereby the shear blades are brought together and then separated during the movement of the piston in either direction.

13. In combination, cutter arms, blades carried thereby, means to actuate said arms and cause the blades to come together in shearing relation, means to cause one blade to bear with a spring pressure against the other blade, and separate means for applying a spring pressure to the second blade in the opposite direction to balance said first mentioned pressure.

14. The combination of cutter arms, blades carried thereby, means to actuate said arms and cause the blades to come together in shearing relation with one blade above the other, means for causing the upper blade to bear downward with a spring pressure against the lower blade, and separate means for causing an upward spring pressure of the lower blade against the upper blade.

15. The combination of cutter arms, blades carried thereby, means to actuate said arms and cause the blades to come together in shearing relation with one blade above the other, means for causing the upper blade to bear downward with a spring pressure against the lower blade, separate means for causing an upward spring pressure of the lower blade against the upper blade, and means operable while the parts are assembled for adjusting one blade up and down relative to the other.

Signed at Toledo, in the county of Lucas and State of Ohio, this 10th day of September, 1924.

ALBERT N. CRAMER.